July 13, 1965 W. D. WALTHER 3,194,606
RIM, WHEEL AND SPACER ASSEMBLIES
Filed Nov. 4, 1963 5 Sheets-Sheet 3

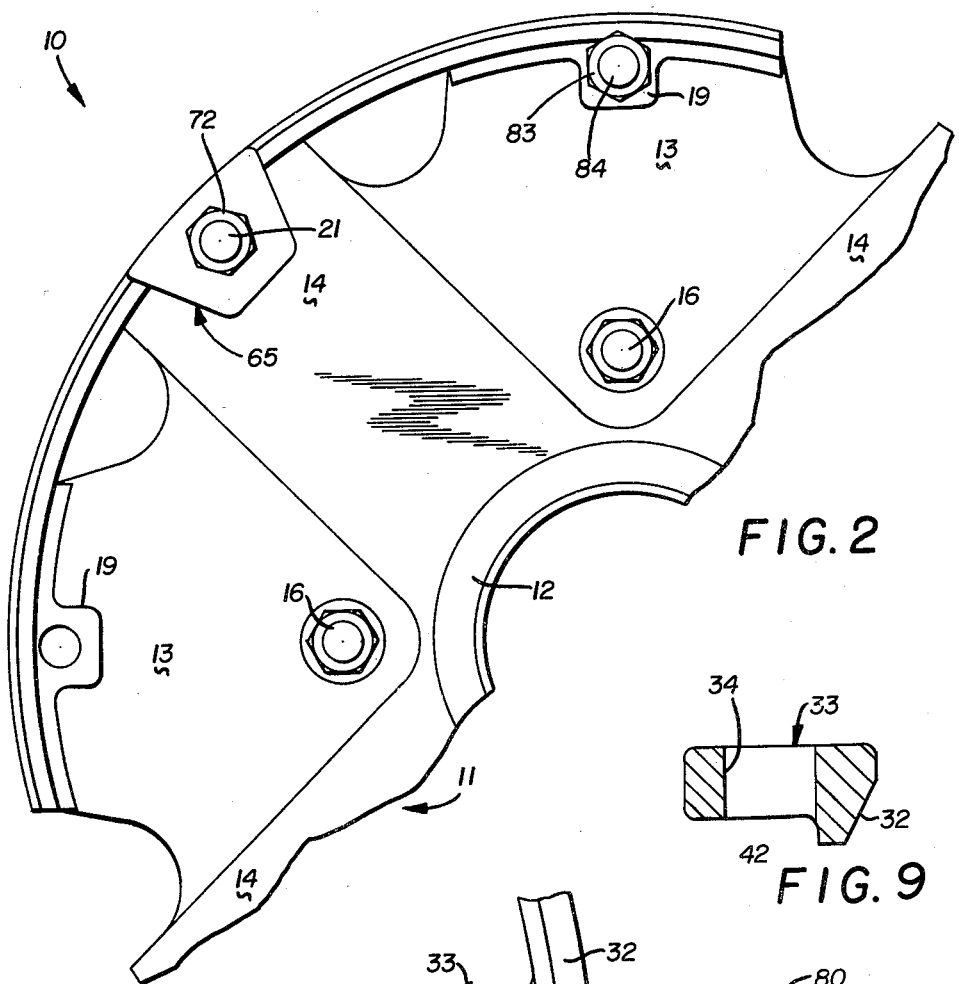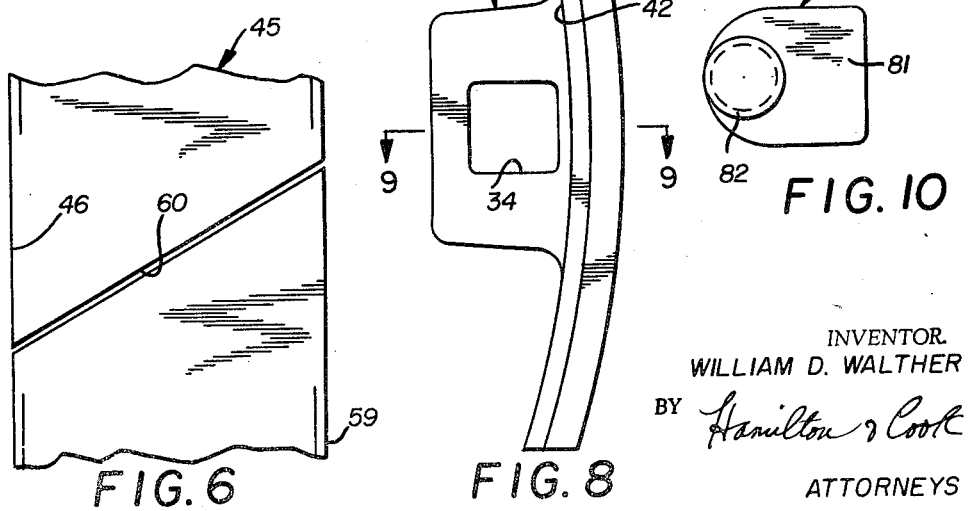

INVENTOR.
WILLIAM D. WALTHER
BY *Hamilton & Cook*
ATTORNEYS

July 13, 1965 W. D. WALTHER 3,194,606
RIM, WHEEL AND SPACER ASSEMBLIES
Filed Nov. 4, 1963 5 Sheets-Sheet 4

INVENTOR.
WILLIAM D. WALTHER
BY *Hamilton & Cook*
ATTORNEYS

July 13, 1965

W. D. WALTHER 3,194,606

RIM, WHEEL AND SPACER ASSEMBLIES

Filed Nov. 4, 1963

INVENTOR.
WILLIAM D. WALTHER
BY *Hamilton & Cook*
ATTORNEYS

United States Patent Office 3,194,606
Patented July 13, 1965

3,194,606
RIM, WHEEL AND SPACER ASSEMBLIES
William D. Walther, Dayton, Ohio, assignor to The Dayton Steel Foundry Company, Dayton, Ohio, a corporation of Ohio
Filed Nov. 4, 1963, Ser. No. 321,034
8 Claims. (Cl. 301—13)

The present invention relates generally to rim, wheel and spacer assemblies. More particularly, the present invention relates to the mounting of dual interchangeable rims on a wheel. Specifically, the present invention relates to improvements in rim, wheel and spacer constructions providing a more effective mounting of rims in dual fashion on a wheel to maintain accurate alignment of both rims with respect to the wheel and maintain lateral runout control.

It is highly desirable to provide a mounting for dual rims which will ensure that both rims are in positive and exact alignment with a plane perpendicular to the axis of rotation of the wheel not only when the vehicle is at rest, but particularly when the vehicle is in motion and subject to dynamic forces and stresses.

If either, or both, of the rims are mounted on the wheel in such a manner as to lie in a plane which is not perpendicular to the rotational axis of the wheel, the tread on the tire will not contact the ground or roadway in a straight track with respect to the line of travel of the vehicle, but will meet the ground angularly, thus causing undue wear to the tire. Moreover a canted inclination of the tire would cause it to wobble, inducing at certain speeds a harmonic vibration such as to dangerously affect operation of the vehicle.

Control of lateral runout, achieved by maintenance of the concentricity of the rim with respect to the rotational axis of the wheel, is also important to the safe operation of the wheel. An eccentric rim mounting will induce harmonic vibrations at certain speeds. Eccentricity will also give rise to a shock loading with every revolution of the wheel, inducing excessive strains on the rim and clamping devices.

Along with the maintenance of rim alignment and concentricity, it is also desirable that the dual rims be readily interchangeable for mounting in either the inner or outer position.

One difficulty in securing and maintaining accurate alignment and concentricity has been the problem of keeping the inner rim in alignment while the spacer, outer rim and clamping means are successively placed in position. The weight of the ram and tire causes it to slide on the beveled mounting surface found at the axially inner side of the conventional wheel. Once the inner rim is positioned out of alignment and/or concentricity, it is difficult to restore the correct position.

Another cause of misalignment and failure to maintain concentricity is the uneven and irregular tightening of the rim clamp devices and possible distortion of the spacer.

It is therefore an object of the present invention to provide a rim, wheel and spacer assembly in which rim alignment and concentricity is assured, while the inner and outer rims are interchangeable.

It is a further object of the present invention to provide a rim, wheel and spacer assembly in which each rim may be individually secured in proper alignment and concentricity.

It is a still further object of the present invention to provide a rim, wheel and spacer assembly which is operative under emergency conditions with either rim removed.

It is a still further object of the present invention to provide a rim, wheel and spacer assembly for maintaining rim alignment and concentricity yet which is light in weight and low in cost.

These and other objects which will become apparent from the following specification are accomplished by means hereinafter described and claimed.

Two forms of a dual rim, wheel and spacer assembly according to the invention are shown by way of example in the accompanying drawings and hereinafter described in detail, without attempting to show all of the various forms and modifications in which the invention might be embodied; the invention being measured by the appended claims and not by the details of the specification.

In the drawings:

FIG. 2 is a fragmentary plan view of the assembly in FIG. 1;

FIG. 6 is a fragmentary view of the spacer taken substantially as indicated on line 6—6 of FIG. 3;

FIG. 8 is a fragmentary plan view of the clamp lugs shown in FIG. 1 for mounting the inner of the dual rims;

FIG. 9 is a section through a clamp lug taken substantially as indicated on line 9—9 of FIG. 8;

FIG. 10 is a full plan view of the clamp bolts shown in FIG. 7 for mounting the inner of the dual rims;

A rim, wheel and spacer assembly according to the invention for mounting dual interchangeable inner and outer rims and a spacer is indicated generally by the numeral 10. The wheel 11 has a plurality of inner and outer spoke members. The outer end of each spoke member has an axially flat or substantially horizontal felly surface. The spacer which separates and positively aligns the rims when seated on the felly surfaces has a radially inwardly directed flange received in notches on the medial portion of the felly surfaces of one set of spoke members. Clamping devices for holding the rims in positive contact with the spacer are carried on the axially inner set of spoke members and on the axially outer side of the outer set of spoke members.

Figure 1:
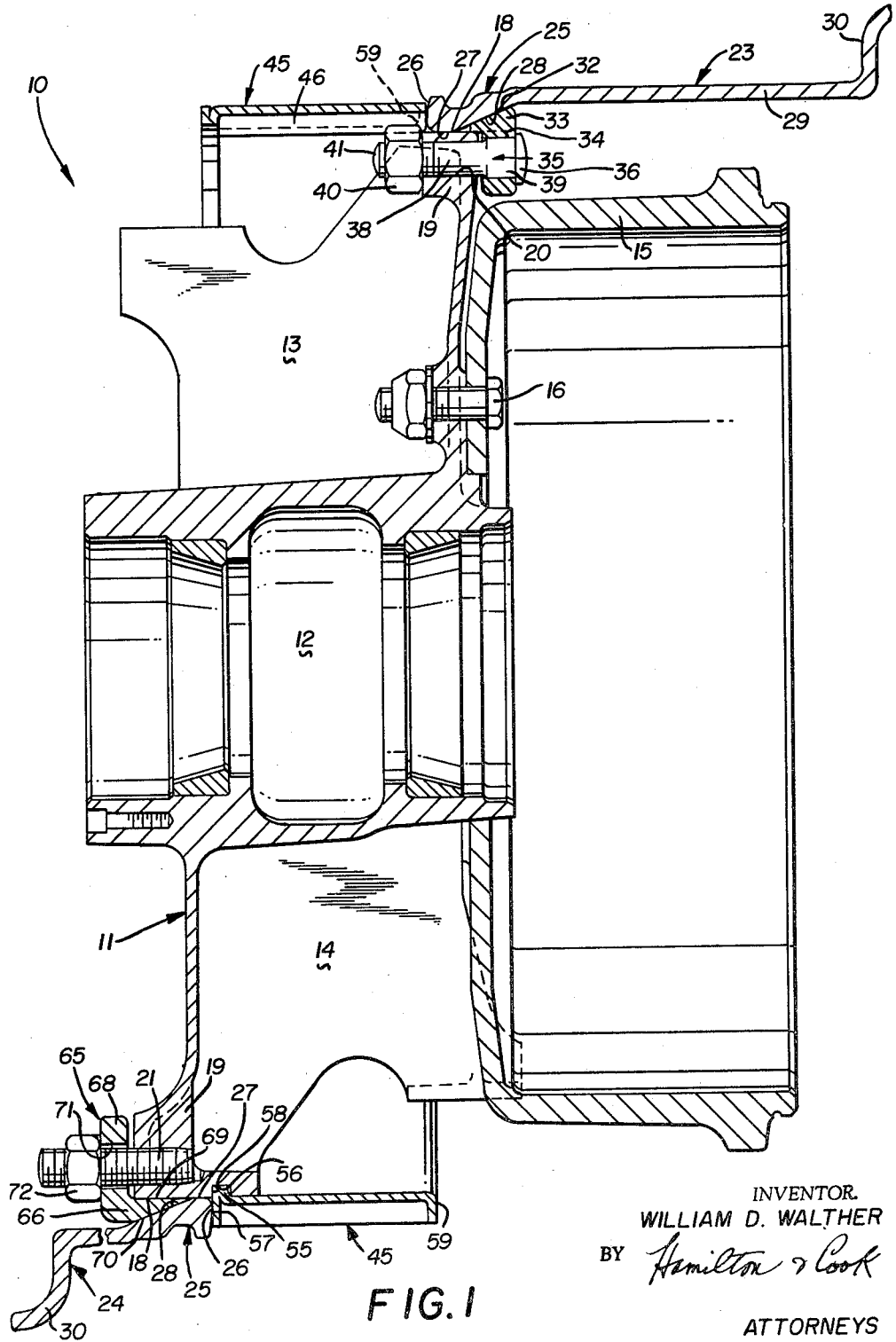
FIG. 1 is a sectional view of a dual rim, wheel and spacer assembly according to the invention.
Figure 7:
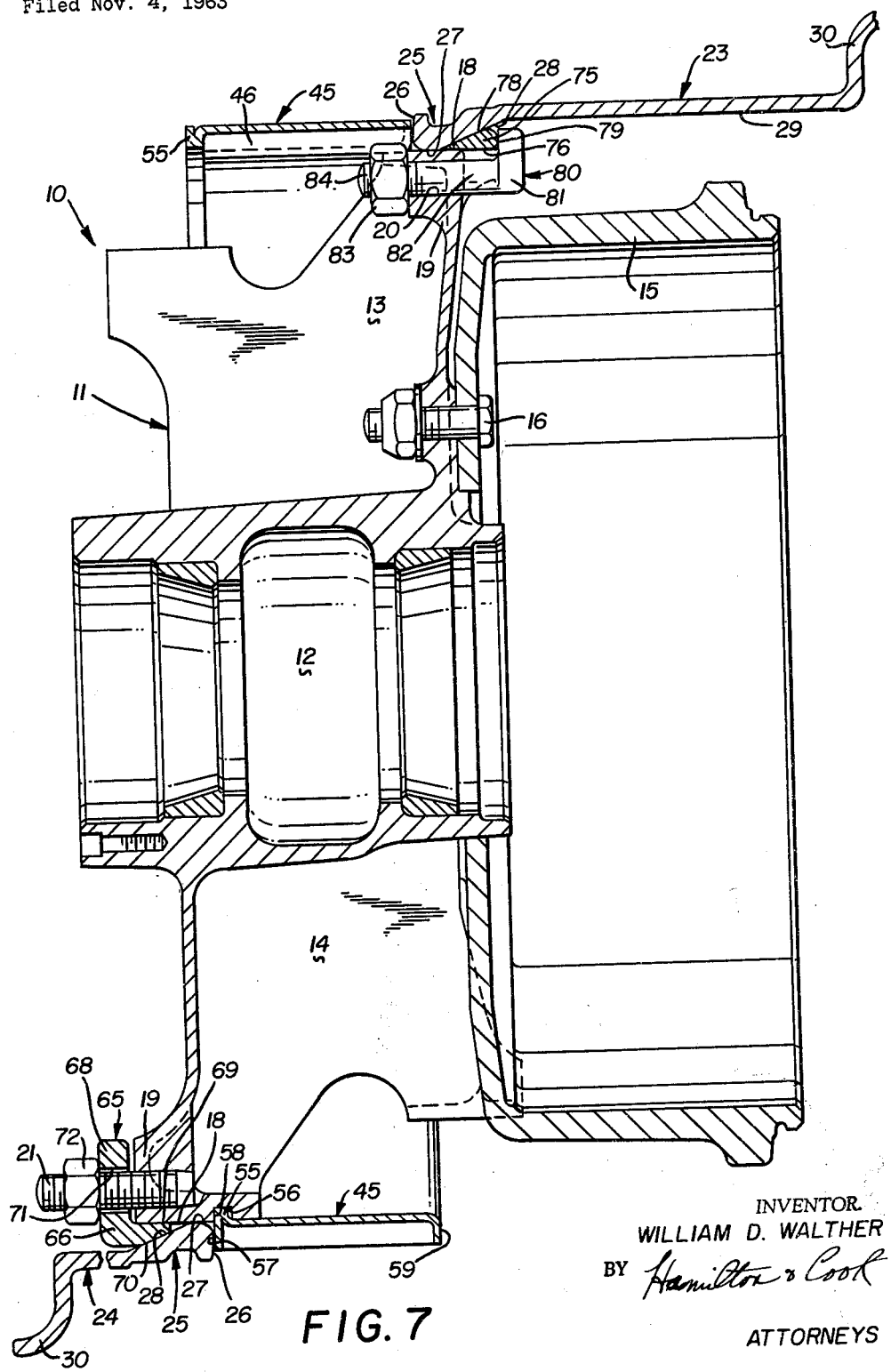
FIG. 7 is a sectional view showing another form of dual rim, wheel and spacer assembly according to the invention.

Referring to FIGS. 1 and 7 the wheel 11 has a conventional hub area 12. The radially extending spoke members are preferably integrally and continuously cast with the hub member in a generally radially corrugated configuration with the inwardly directed convolutions forming the inner spoke members 13 and the outwardly directed convolutions forming the outer spoke members 14. As disclosed herein (see FIG. 2), a wheel 11 may have a set of four inner spoke members 13 staggered or alternatingly disposed in relation to a set of four outer spoke members 14. Such a "four-four spoke" construction is preferred, although so-called "three-three," "five-five," or even "six-six" constructions could be used if desired, depending upon the diameters of the tires to be mounted.

The radially corrugated configuration of the wheel 11 not only provides the required axial separation from the ends of the spoke members 13 and 14 sufficient for working clearance between tires carried on the rims mounted thereon, but the axially inner convolution provides radially extending circumferentially spaced surfaces for attachment of a brake drum 15, as by a series of bolts 16.

The outer end of each spoke member 13 and 14 terminates in an accurately machined, axially flat or substantially horizontal, load bearing of felly surface 18. A boss 19 adjacent the outer end of each inner spoke member 13 has an axially extending bore 20 therethrough to receive the supporting element for an inner spoke rim clamping device, as described in detail below. A similar boss 19 on each outer spoke member 14 carries an axially outwardly directed stud bolt 21 for supporting the outer spoke rim clamping device, also described in detail below.

As shown, the inner rim 23 and outer rim 24 are of the so-called "flat-base" type construction. Such a rim construction has a mounting flange indicated at 25 with a radially oriented gutter or positioning surface 26, an axially oriented felly engaging or seating surface 27 and an axially inclined holding surface 28. The medial portion of a flat-base type rim is defined by an axially extending web 29 terminating in a fixed bead flange 30. Other types of rim construction, such as the so-called "drop-center" type rim, could be used in the practice of the invention so long as such rim had the equivalent of mounting flange 25 and the positioning surface 26, seating surface 27 and mounting surface 28.

Figure 11:
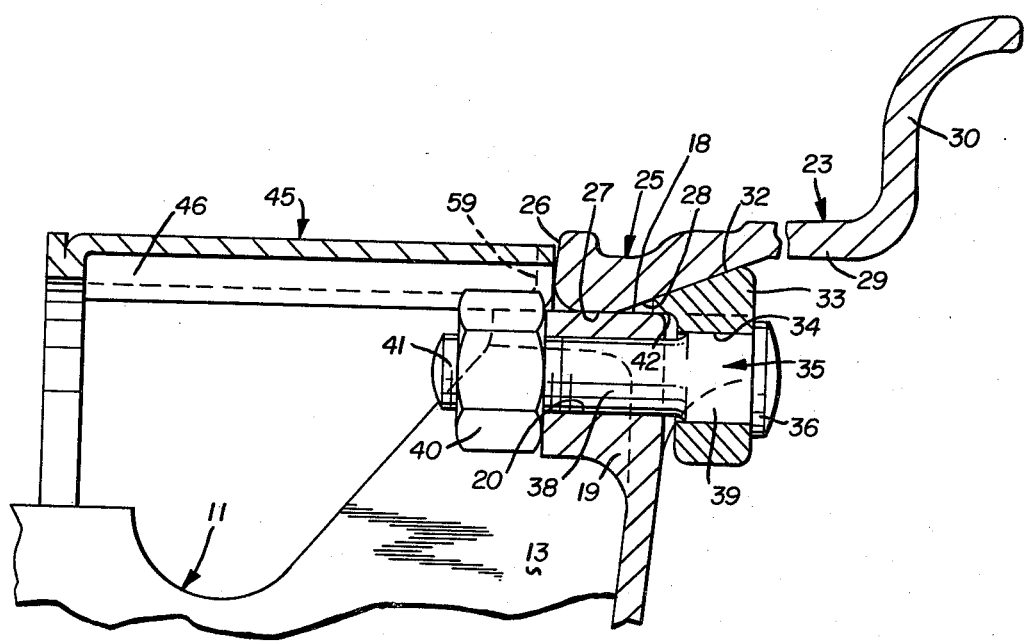
FIG. 11 is an enlarged fragmentary view of a portion of FIG. 1.

The form of assembly as shown in FIGS. 1 and 11 for mounting the dual interchangeable inner and outer rims 23 and 24, has individual clamping elements carried by each spoke member for holding the rims in contact with the positioning spacer.

As shown in both FIGS. 1 and 11, the inner rim 23 is mounted on the spoke member 13 with the flange surface 27 seated on and engaging the axially flat felly surfaces 18 and with the flange surface matingly engaging a correspondingly inclined conical mounting surface 32 on the radially outer portion of each clamp lug 33. Referring also to FIGS. 8 and 9, the radially outer portion of each clamp lug 33 has a preferably square hole 34 therethrough to accommodate a supporting and clamping element indicated at 35, extending through the bore 20 in an inner spoke.

As best seen in FIG. 11, the axially inner end of a supporting element 35 has an enlarged head portion 36 for engaging a clamp lug 33. The shank portion 38 conforms with the bore 20. Between the shank 38 and head 36, there is a portion 39 conforming to the shape of the clamp lug hole 34 so that the support element will not rotate during tightening of a nut 40 on a threaded portion 41 extending axially outward of the boss 19 of each spoke member 13.

As best seen in FIGS. 8 and 9, a clamp lug 33 has an enlarged circumferential dimension and an arcuate radially inner surface 42 intended to slide on the felly surfaces 18 during tightening of the support element 35 for each clamp lug. It is preferred that the circumferential dimension of a clamp lug 33 be substantially equal to the circumferential extent or span of each felly surface 18 so that the mounting surfaces 32 on each clamp lug will exert the maximum holding force against the surface 28 on an inner rim 23.

Figure 3:
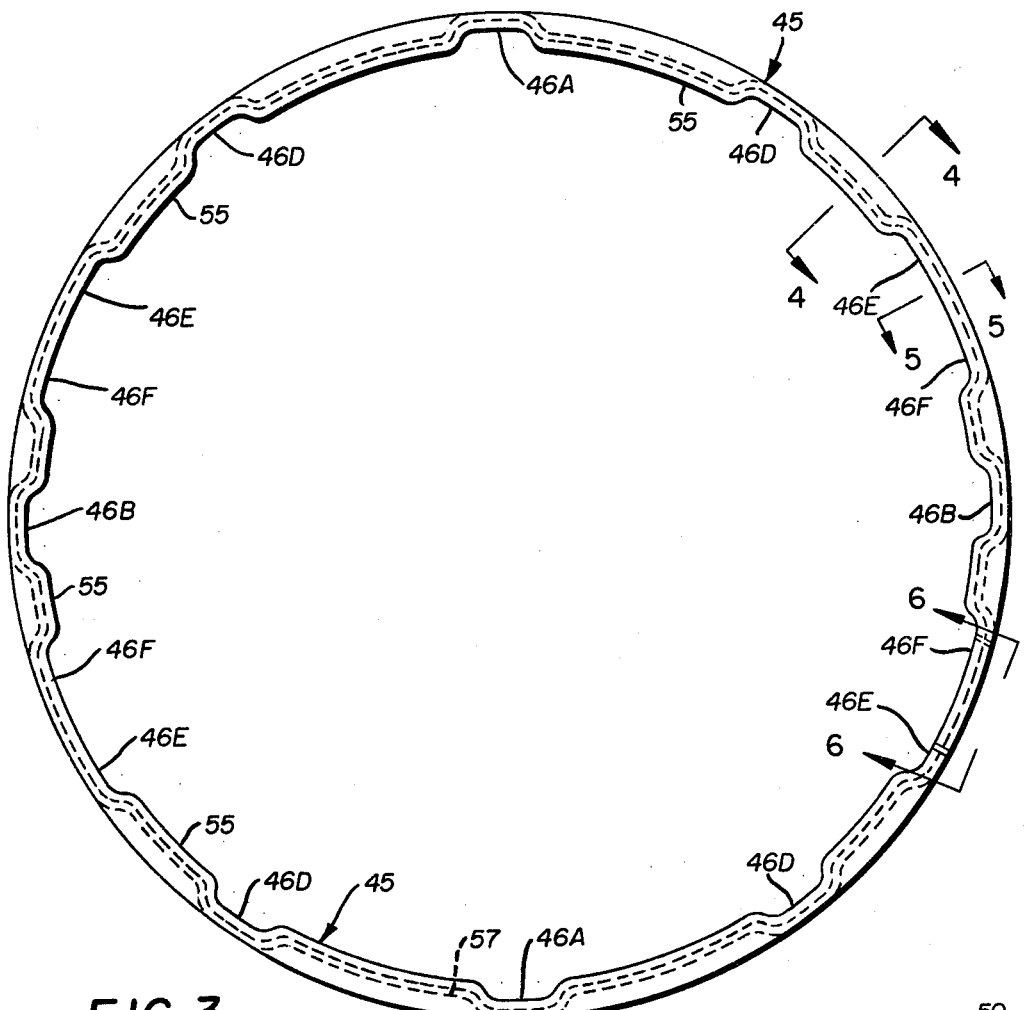
FIG. 3 is a plan view of the spacer shown in FIG. 1 for separating the dual rims.
Figure 4:
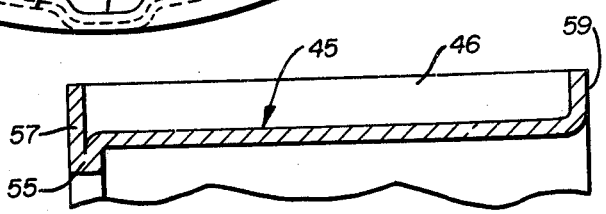
FIG. 4 is a section through the spacer band taken substantially as indicated on line 4—4 of FIG. 3.
Figure 5:
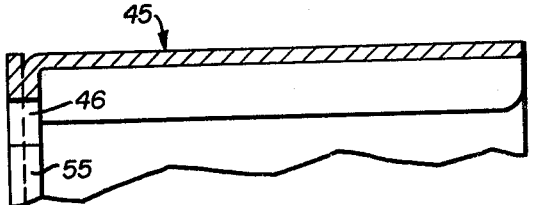
FIG. 5 is another section taken substantially as indicated on line 5—5 of FIG. 3.

The spacer indicated at 45 is a cylindrical band which is transversely split for mounting. As best seen in FIG. 3, the spacer band has circumferentially spaced axial corrugations 46 appropriately spaced around the circumference of the band to provide clear and free access to the nuts 40 of the inner clamp lug supports 35.

The spacer 45, as shown, separates and positions the inner and outer rims, 23 and 24, mounted on a "four-four spoke" wheel 11. When the spacer is mounted on such a wheel, one pair of the opposed corrugations as designated at 46A, and one pair of the opposed corrugations as designated at 46B, each of these corrugations being spaced 90° apart, will align with the support elements 35 on the inner spoke members 13. The radially outward configuration of each of the corrugations 46 has an axial extent sufficient to provide free and clear access to the tightening nuts 40.

The spacer 45, as shown, could also be used to separate and position dual rims mounted on so-called "three-three," "five-five" and "six-six spoke" wheels. Such versatility of use or universality of application is made practical by providing the spacer with a series of additional corrugations, such corrugations providing both access and further strengthening against axial distortion.

These additional corrugations are located on center lines, away from and on each side of each of the two primary corrugations 46A. In a geometric sense, the corrugations 46A may be regarded as being "primary" and the corrugations 46B may be regarded as being "secondary." The additional corrugations are located as follows: corrugations 46D spaced at 36° one on either side of each corrugation 46A; corrugations 46E spaced at 60° one on either side of each corrugation 46A; and corrugations 46F spaced at 72° one on either side of each corrugation 46A. It will be noted that, as shown in FIG. 3, each two closely adjacent corrugations 46E and 46F of a spacer have a radially outward configuration which is continuous, to provide adequate access to the tightening nuts of the various spoke number wheels.

When the spacer 45 is used on a "three-three spoke" wheel, one of the primary corrugations 46A and the two corrugations 46E which are furthest away from the selected corrugation 46A will align with the support elements on the inner spoke members of that wheel.

When the spacer 45 is used on a "five-five spoke" wheel, a selected primary corrugation 46A, the two additional corrugations 46F which are closest thereto, and the two additional corrugations 46D which are furthest away from the selected corrugation 46A will align with the support elements on the inner spoke members of that wheel.

When the spacer 45 is used on a "six-six spoke" wheel, both of the primary corrugations 46A and all four of the additional corrugations 46E will align with the support elements on the inner spoke members of that wheel.

The spacer 45 is also constructed to provide a positive stop and aligning means for axial positioning of the inner and outer rims, 23 and 24. Between each of the spacer corrugations 46 described just above the radially innermost portions of one edge of the spacer are formed in a stop flange 55. The flange portions 55 are inserted in an accurately machined arcuate receiving notch 56 on the felly portion of a spoke member 14.

As shown in FIGS. 1 and 7, the receiving notches 56 are on the axially inner portion of the felly surface 18 of each outer spoke member 14. Each notch 56 has an axial extent or dimension slightly greater than the width of the radially inner portions of the spacer flanges 55.

The axially outer face of each flange 55 has a surface 57 extending radially of and substantially perpendicular to the rotational axis of the wheel 11. The surfaces 57 are seated axially outwardly against a stop or register surface 58 on the axially outer side of each notch 56. Between the corrugations 46, the axially inner faces of the spacer 45 have a surface 59 extending radially of and substantially perpendicular to the rotational axis of the wheel 11 which contacts the radially oriented gutter or positioning surface 26 on the mounting flange of the inner rim 23.

Referring to FIG. 1, to mount the inner rim 23, each support element 35 carrying a clamp lug 33 is inserted in a bore 20 and the inner rim is slipped over the outer spoke members and located on the inner spoke members 13 axially inwardly against the clamp lugs. Then, the spacer 45, split as at 60 transversely and preferably on a bias for ease of mounting, is placed in axial registry with the appropriate notches 46 corresponding to the inner spoke members and slipped over the outer spoke members until the flanges 55 are inserted in the notches 56. Then, each nut 40 is tightened to move the clamp lugs 33, with the arcuate surface 42 in sliding engagement with each felly surface 18, axially outwardly into holding engagement with the rim 23. When the support means 35 have been fully tightened, the slight axially outward movement of the rim 23 will urge the spacer 45 axially outwardly until engagement of the surfaces 57 against the register surface 58 of each notch 56, assuring that the inner rim flange surfaces 26, 27 and 28 will be fully and correctly seated.

The interchangeable outer rim 24 is positioned with the seating surface 27 engaging the felly surfaces 18 of the outer spoke members 14 and the positioning surface 26 contacting the radially oriented aligning surface 57 on the spacer 45.

Outer clamp lugs indicated at 65 are then mounted on the stud bolts 21. Each outer clamp lug 65 has an axially oriented or lateral leg 66 and a radially oriented or upright leg 68. The lateral leg 66 has an arcuate surface 69 on the radially inner side thereof for slidably engaging the felly surfaces 18 and a conical or axially inclined mounting surface 70 on the radially outer side thereof for matingly engaging the axially inclined mounting surface 28 on the outer rim 24. An axial bore 71 through the radial leg 68 of each clamp lug 65 receives the stud bolt 21 having a threaded portion for mounting a nut 72 which is tightened to move the clamp lug axially inwardly into holding engagement with the outer rim 24. When the nuts 72 have each been fully tightened, the slight axially inwardly movement of the rim 24 will assure that the rim mounting flange surfaces 26, 27 and 28 will be fully and correctly seated.

Figure 12:
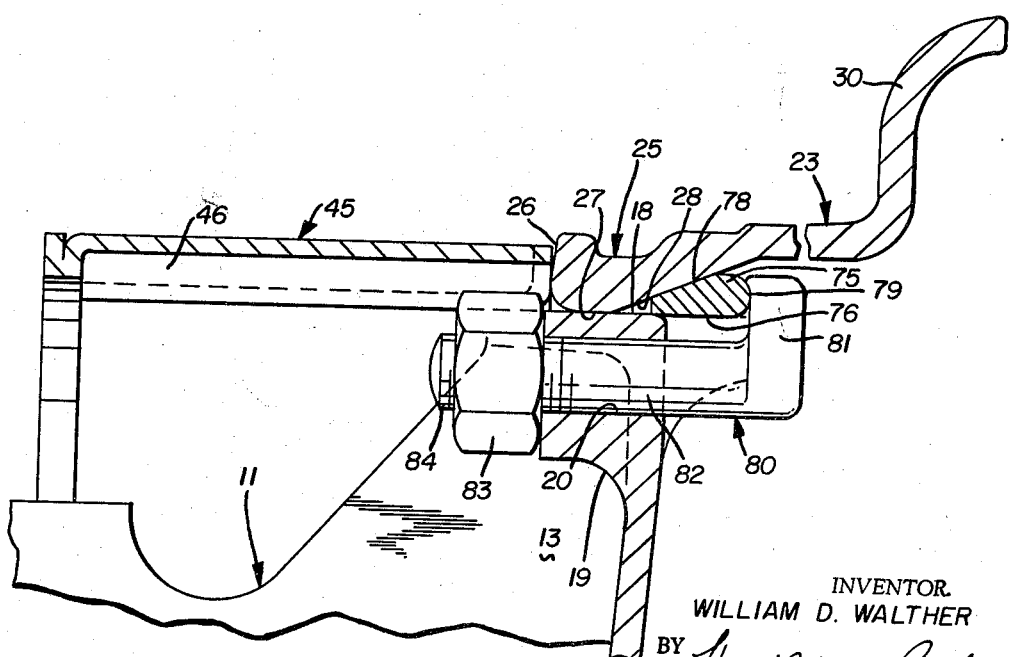
FIG. 12 is an enlarged fragmentary view of a portion of FIG. 7.

The form of assembly for mounting the dual interchangeable inner and outer rims, 23 and 24, as shown in FIGS. 7 and 12, uses the spacer 45 and a circumferentially continuous clamp element carried by each inner spoke member for holding the inner rim 23 in contact with the radially oriented surfaces 59 of the spacer.

Referring specifically to FIGS. 7 and 12, a circumferentially continuous or "one-piece" wedge ring 75 contacts and holds the mounting flange of an inner rim 23. The wedge ring 75 has an arcuate radially inner surface 76 intended to slide on the felly surfaces 18 and an inclined mounting surface 78 intended to matingly engage with the rim flange surface 28. The axially inner or thickened edge of ring 75 has a surface 79, preferably rounded, but of any suitable shape to be positively contacted and engaged by a supporting and wedge ring clamping element indicated at 80, extending through the bore 20 in an inner spoke end.

As best seen in FIGS. 10 and 12, the clamping means or element 80 has an enlarged head portion 81 engaging the surface 79 of the wedge ring 75. The shank portion 82 conforms with the bore 20. A nut 83 on a threaded portion 84 extending axially outward of the boss 19 on a spoke member 13 provides for tightening of the wedge ring and clamp elements so that the inner rim 23 will be fully and correctly seated against the spacer 45.

What is claimed is:

1. A rim, wheel and spacer assembly for mounting dual interchangeable inner and outer rims having a mounting flange on a wheel having a plurality of inner and outer spoke members, each spoke member having an axially spaced-apart and staggered relation to an adjacent spoke member, the outer end of each spoke member having an axially flat felly surface, the axially inner portion of the felly surface of each outer spoke member having an arcuate notch, said notch extending radially inwardly of said felly surface and having at least one aligning surface, a rigid spacer having a radially inwardly directed flange on the axially outer side thereof received in said notches, a surface on said flange for matingly engaging said notched stop surface, and clamp elements carried by each spoke member for holding the rims in contact with said spacer and the mating surface on said flange in abutment with said notch aligning surface.

2. A rim, wheel and spacer assembly for mounting dual interchangeable inner and outer rims having a mounting flange on a wheel having a plurality of inner and outer spoke members, each spoke member having an axially spaced-apart and staggered relation to an adjacent spoke member, the outer end of each spoke member having an axially flat felly surface, the axially inner portion of the felly surface of each outer spoke member having an arcuate notch, a spacer having a radially inwardly directed flange on the axially outer side thereof received in said notches, each said notch having an axial extent slightly greater than the width of said spacer flange and a register surface on the axially outer side thereof, said spacer flange having an axially outer surface extending radially of and substantially perpendicular to the rotational axis of the wheel, and clamp elements carried by each spoke member for holding the rims in contact with said spacer and moving said spacer flange axially into contact with the register surfaces of said notches.

3. A rim, wheel and spacer assembly for mounting dual interchangeable inner and outer rims having a mounting flange on a wheel having a plurality of inner and outer spoke members, each spoke member having an axially spaced-apart and staggered relation to an adjacent spoke member, the outer end of each spoke member having an axially flat felly surface, the axially inner portion of the felly surface of each outer spoke member having an arcuate notch, a spacer having a radially inwardly directed flange on the axially outer side thereof received in said notches, each said notch having an axial extent slightly greater than the width of said spacer flange and a register surface on the axially outer side thereof, said spacer flange having an axially outer surface extending radially of and substantially perpendicular to the rotational axis of the wheel, clamp elements carried by said inner spoke members for contacting an inner rim and moving said spacer flange axially outwardly into contact with the register surfaces of said notches, and additional clamp elements carried by said outer spoke member for holding an outer rim in contact with said spacer.

4. A rim, wheel and spacer assembly for mounting dual interchangeable inner and outer rims on a wheel having a plurality of inner and outer spoke members, each spoke member having a felly surface with an axially spaced-apart relation to the felly surface of an adjacent spoke member, each rim having a mounting flange with a radially oriented positioning surface (26), an axially oriented seating surface (27) and an axially inclined holding surface (28), the felly surface of each spoke member being axially flat for seating a mounting flange, there further being an arcuate notch on the axially inner portion of the felly surface of each outer spoke member, a spacer having a radially inwardly directed flange on the axially outer side thereof received in said notches and a radially oriented surface on the axially inner side thereof, clamp elements carried by said inner spoke members for holding an inner rim seated on said felly surfaces against said spacer surface, and additional clamp elements carried by said outer spoke member for holding an outer rim seated on said felly surfaces against said spacer flange.

5. A spacer for separating and positioning dual interchangeable inner and outer rims mounted on a wheel, comprising, a cylindrical band having edge portions and a series of circumferentially spaced axial corrugations, including one pair of opposed "primary" corrugations, a second pair of opposed "secondary" corrugations, each of these said corrugations being spaced 90° apart, additional corrugations located on center lines away from and on each side of each of the two said primary corrugations, the center lines of said additional corrugations being located at 36°, 60° and 72°, and a stop flange extending radially inwardly from said cylindrical band.

6. A spacer for separating and positioning dual interchangeable inner and outer rims which are mounted on a wheel comprising, a cylindrical band having edge portions, said band having a series of circumferentially spaced axially extending corrugations extending continuously across said band and merging into the end portions, said band being axially rigid, a flange extending radially inwardly from one of said edge portions and presenting a radially extending stop surface.

7. A rim, wheel and spacer assembly for mounting dual interchangeable inner and outer rims on a wheel having a felly surface, an arcuate notch in said felly surface, a spacer mounted between said rims, said spacer being axially rigid, a radially inwardly directed flange on said spacer received in said notch, axially positionable clamping means carried on the axially inner side of said wheel for holding said inner rim against said spacer and separate, circumferentially spaced, axially positionable clamping means carried on the axially outer side of said wheel for holding said outer rim against said spacer.

8. A rim, wheel and spacer assembly for mounting dual interchangeable inner and outer rims on a wheel having a felly surface, an arcuate notch in said felly surface, a radially oriented register surface forming one axial extremity of said notch, a spacer mounted between said rims, said spacer being axially rigid and having a cylindrical body portion the axial extent of which engages said felly surface along at least a plurality of circumferentially spaced locations, a radially inwardly directed flange on said spacer received in said notch, a radially oriented face on said flange, axially positionable clamping means carried on the axially inner side of said wheel for holding said inner rim against said spacer and separate, circumferentially spaced, axially positionable clamping means carried on the axially outer side of said wheel for holding said outer rim against said spacer, said radially oriented flange abuttingly engaging said register surface in said notch when said rims are mounted on said wheel.

References Cited by the Examiner
UNITED STATES PATENTS

| | | | |
|---|---|---|---|
| 1,966,828 | 7/34 | Miller | 301—65 |
| 1,975,273 | 10/34 | Higbee | 301—13 X |
| 2,100,626 | 11/37 | Brink | 301—13 |
| 2,767,026 | 10/56 | Walther | 301—13 |
| 3,079,200 | 2/63 | Main | 301—13 |

FOREIGN PATENTS 746,680   3/56   Great Britain.

ARTHUR L. LA POINT, *Primary Examiner.*

UNITED STATES PATENT OFFICE
CERTIFICATE OF CORRECTION

Patent No. 3,194,606                     July 13, 1965

William D. Walther

It is hereby certified that error appears in the above numbered patent requiring correction and that the said Letters Patent should read as corrected below.

Column 3, line 2, for "of" read -- or --; column 7, line 3, for "end" read -- edge --; column 8, after line 20, insert the following:

3,143,376      8/64     Di Federico-----301-13

Signed and sealed this 22nd day of March 1966.

(SEAL)
Attest:

ERNEST W. SWIDER                       EDWARD J. BRENNER
Attesting Officer                           Commissioner of Patents